Aug. 19, 1969 C. J. VAN DALEN 3,462,550

RHYTHMIC TELECOMMUNICATION SYSTEM WITH AUTOMATIC ERROR CORRECTION USING ONE SERVICE SIGNAL

Filed Feb. 27, 1967 2 Sheets-Sheet 1

INVENTOR.
CHRISTIAAN J. VAN DALEN
BY Hugh A. Kirk
ATTORNEY

Aug. 19, 1969 C. J. VAN DALEN 3,462,550

RHYTHMIC TELECOMMUNICATION SYSTEM WITH AUTOMATIC ERROR CORRECTION USING ONE SERVICE SIGNAL

Filed Feb. 27, 1967 2 Sheets-Sheet 2

INVENTOR.
CHRISTIAAN J. VAN DALEN
BY Hugh A. Kirk
ATTORNEY 3,462,550
Patented Aug. 19, 1969

3,462,550

RHYTHMIC TELECOMMUNICATION SYSTEM WITH AUTOMATIC ERROR CORRECTION USING ONE SERVICE SIGNAL

Christiaan Johannes van Dalen, Voorburg, Netherlands, assignor to De Staat der Nederlanden, ten Deze Vertegenwoordigd Door de Directeur-Generaal der Posterijen, Telegrafie en Telefonie, The Hague, Netherlands Continuation-in-part of application Ser. No. 287,824, June 14, 1963. This application Feb. 27, 1967, Ser. No. 618,572
Claims priority, application Netherlands, June 28, 1962 280,306
Int. Cl. H04l 15/24, 17/16, 15/34
U.S. Cl. 178—23 8 Claims

ABSTRACT OF THE DISCLOSURE

A duplex (two-way at the same time) telegraph type telecommunication system having automatic error detection and correction comprising associating numbers with alternate groups of signals transmitted and received, testing each group as it is received, sending the special service signal when an error in a group has been detected, and if the number associated with the group transmitted is the same as the number associated with the group received at a given station, this indicates that a correct signal has been received, but if these associated numbers are different at that station, a repetition of the prior transmitted group must be made.

RELATED APPLICATIONS

Priority Netherlands application Ser. No. 280,306 filed June 28, 1962, and U.S. patent application Ser. No. 287,824 filed June 14, 1963, of which this application is a continuation-in-part, now abandoned.

BACKGROUND OF INVENTION

In well known systems of this kind the repetition of a mutilated signal causes the equipment to be switched over from a traffic condition to a repetition cycle, during which cycle the error is corrected by repetition. Owing to the finite propagation time of the signals, this cycle must occupy a number of signals steps, mostly four or less. An example of this type of system is shown in Van Dalen U.S. Patent No. 2,970,189 issued Jan. 31, 1961 which patent discloses a system in which the slave station operates on a start-stop basis, that is, it only answers when it receives a correct signal, and it is not synchronous with the master and therefore it must use two special service signals to transmit group designations, while in the present synchronous system of this invention only one special service signal is needed.

SUMMARY OF INVENTION

This invention is based on the insight that on arrival of a mutilated signal, only the mutilated signal needs to be blocked and that this signal must be repeated at the next step in the relevant channel. This possibility is realized by working each communication channel (attended by some propagation time) individually and at intervals, in which case spaces or gaps remain between the successive signals corresponding to twice the propagation time. (When signals are mentioned here, signal blocks may be meant as well.) Thus, in the said gaps, no signals belonging to the relevant channel may occur. If the airtime is to be used more or less completely and uninterruptedly, the gaps can be filled up with signals of other channels. Each channel is thought of a terminated by individual transmitting and receiving sets. In order that a mutilated signal can be repeated in the same channel at the next step, it is necessary to signal the mutilation as quickly as possible, for which purpose according to the invention, use is made of one special signal. Successive signals in a channel are numbered in alternate groups and a similar numbering is applied to undisturbed signals received. The signal also offers the possibility of indicating synchronism or non-synchronism between master and slave by a comparator means.

Thus, the primary feature of this invention resides in stopping the alternate counter for numbering successive groups of signals for one revolution so a mutilated or undesired signal can be repeated once, instead of twice before finding the correct numbered group as has been required previously in such systems that alternately number the signal groups.

Generally speaking, the apparatus of this invention comprises a transmitter and receiver at each station. The transmitter includes a tape transmitter, a generator for a special service signal for requesting a repetition, and a binary counter or distributor to control the tape transmitter and associated alternate message signals transmitted with two different groups. The receiver at each station includes an error detector, a detector for the special service signal for requesting a repetition, a repetition determining circuit, a receiver binary counter by counting the correctly received and desired signals and associating them with their proper numbered groups, and a printer for the correct and desired received signals.

In addition, each receiver and transmitter may comprise code converters for converting telegraph five-element code signals into constant ratio code signals, so that the elements at each signal can be easily detected for errors or mutilations.

The improvement of this invention comprises a comparator circuit for comparing the states of the distributor counter with the receiver counter for controlling the special service signal detector, the error detector, and a repetition determining circuit which also controls the error detector.

If a correct traffic signal is received and it is of the same numbered group as that associated with the transmitted signal, it is printed and the next traffic signal is transmitted. However, if the correctly received traffic signal does not belong to the same associated group, then the comparator, error detector, and repetition determining circuit prevent the local tape printer and local receiving counter from printing and counting the undesired signal. The error detector controls the local special service generator to transmit a special signal to request a repetition if an erroneous signal has been detected, and it stops the local tape printer and the local tape transmitter, and it also causes the local receiving counter to halve its counting until the error is corrected.

If a special service signal requesting a repetition is received and it is in the same associated group as expected, then the last traffic signal is repeated while the printer and the stepping of the tape are blocked. In the other hand, if a special service signal requesting a repetition is received and it is not in the same associated group as expected, then another special service signal is transmitted while the printer and the stepping of the tape are blocked.

The distributor counter is arranged to take one step for each distributor rotation at the relevant end of the system during normal working, but after the first reception and odd-numbered receptions of a mutilated signal and/or of a service signal the distributor rotation counter remains in the same position for the next distributor rotation.

The receiver counter is arranged to take one step after the correct reception of each traffic signal at such end of the system if the positions of the two counters of a pair correspond but the receiver counter remains in the same position on reception of a mutilated signal or of a service signal. After the initial synchronism both counters are in the same counting state.

Objects and advantages

Thus it is an object of this invention to aim at a quick, simple and effective correction of mutilated signals in a rhythmic two-way multi-element signal synchronized signalling system.

Another object is to produce such a system which does not require a reception cycle of four or less steps, and only blocks multilated signal so it can be prepared at the next step in its relevant channel or associated group.

Another object is to produce such a system in which only one warning signal or special service signal is necessary to request the repetition of an erroneous or mutilated signal, without the requirement of special idle time or other fill-in signals as employed in the prior art.

BRIEF DESCRIPTION OF THE VIEWS

The above mentioned and other features and objects of this invention and the manner of attaining them will become more apparent and the invention itself will be understood best by reference to the following description of an embodiment of the invention taken in conjunction with the accompanying drawings, wherein.

Figure 3:
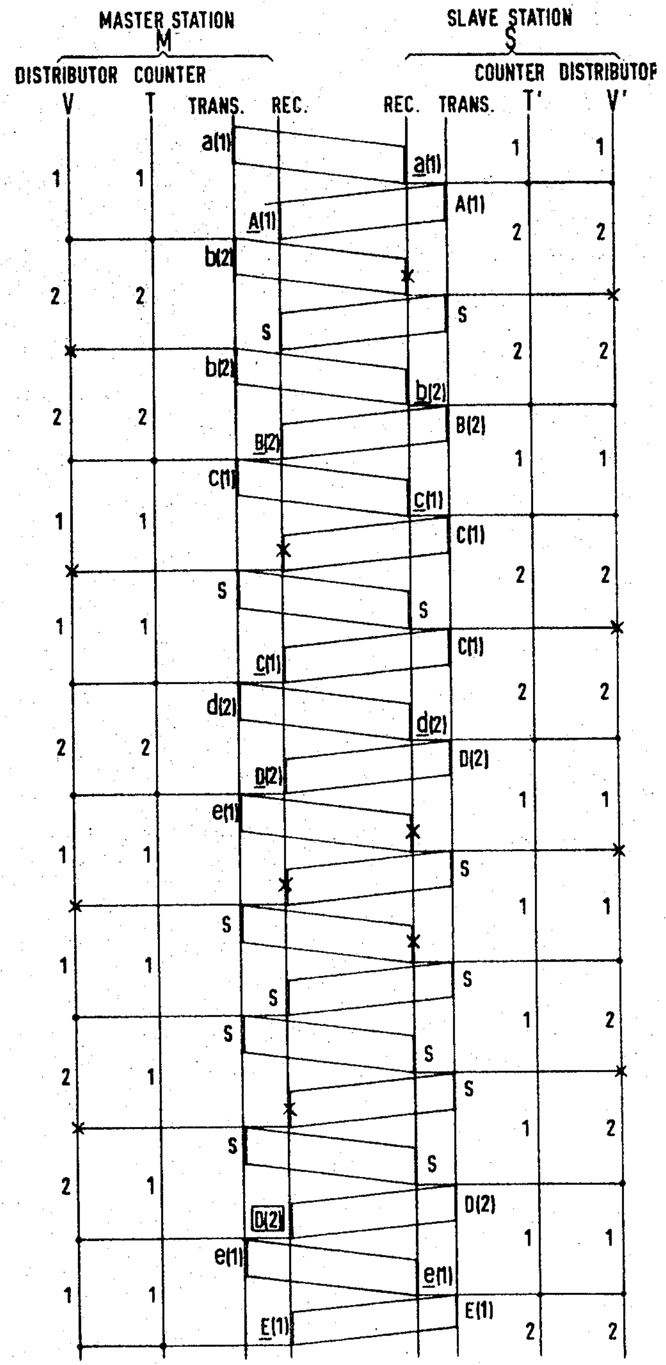
Figure 4:
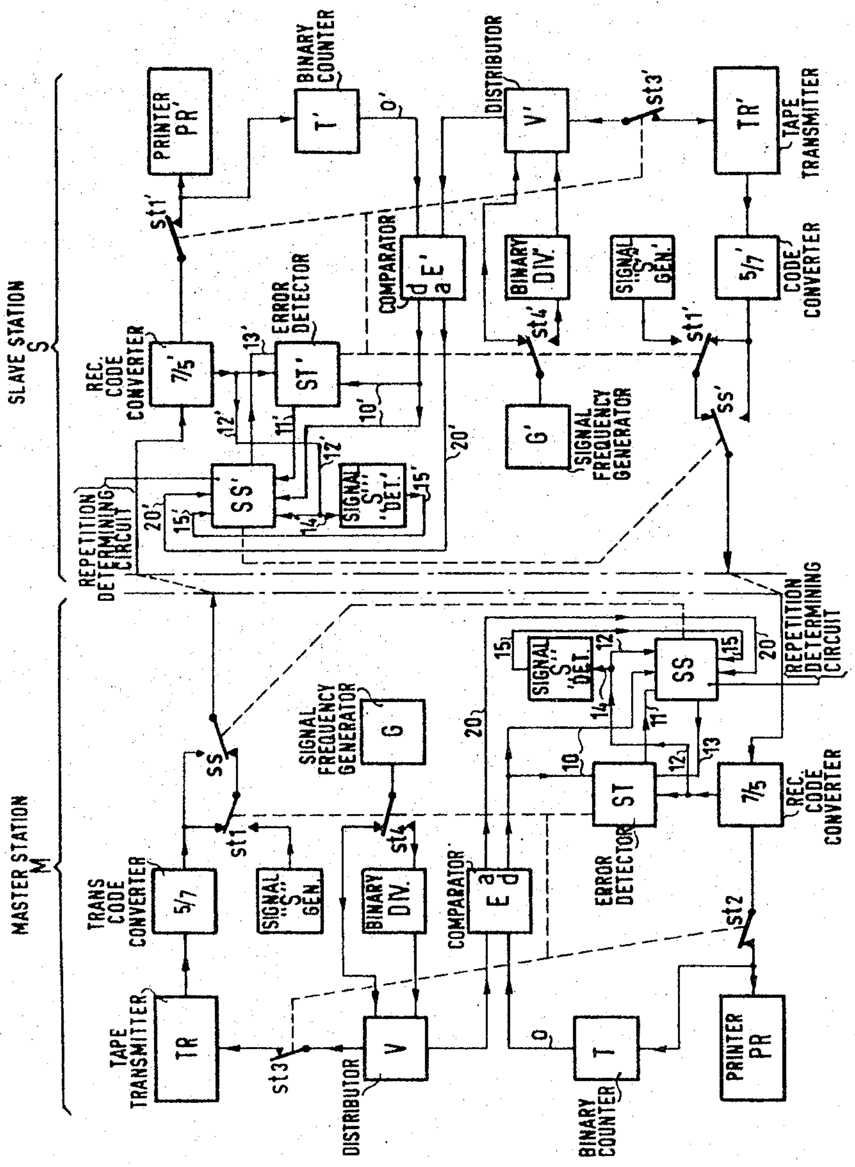

FIG. 3 is a time of a transmitter and receiver of alternate groups of signals between a master and a slave station, associated with the counters at each station for counting and comparing the groups to indicate errors and undesired, and when a special signal is to be sent to request a repetition; and FIG. 4 is a schematic block wiring diagram of a system of two identical stations in communication with each other according to the embodiment of this invention shown in the time diagram of FIG. 3.

DETAILED DESCRIPTION OF THE INVENTION

Figure 1:
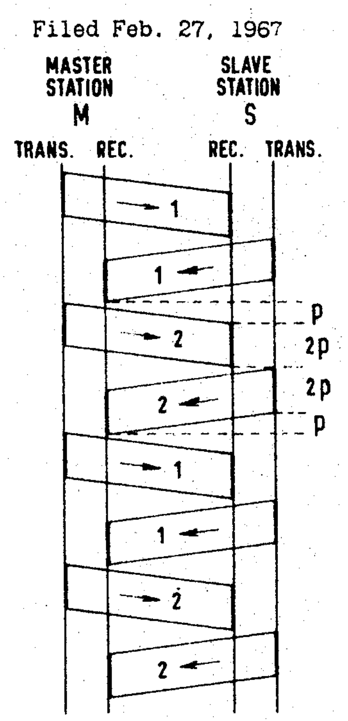
FIG. 1 is a time diagram of a transmitter and receiver of alternate groups of signals between two stations, showing the duration of each group and its propagation time.
Figure 2:
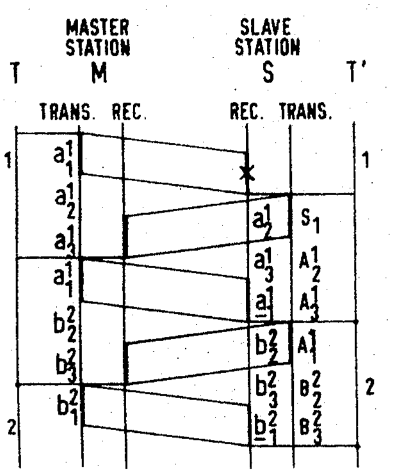
FIG. 2 is a schematic time diagram similar to FIG. 1, but showing interspersed parallel channels or sub-groups and how the counting of each channel is independent from each other.

(1) Signal groups—(FIGS. 1 and 2)

Signals transmitted are placed in groups, e.g. groups (1) and (2), thus: $a^1$, $b^2$, $c^1$, $d^2$, etc., (the number after each letter showing the associated groups of the successive letters of each signal message, see also the counters in FIG. 3). Each of these numbered groups may be accompanied by a number of parallel or sub-groups, that is, $a^1_1$, $a^1_2$, $a^1_3$, etc., (see FIG. 2) each of which parallel or sub-group contains one signal or a block of signals of a different channel or message for filling in the pauses between transmissions of successive associated numbered groups of signals of the same message or channel. If this formation of parallel or sub-groups for filling in the pauses is omitted, each main group still may contain a block of signals, but then there is a pause at least equal to twice the propagation time for the whole main group or block of signals between one transmission and the transmission of the next block of the same message but of the next numbered group. With the letters of successive signals or blocks of the same message, the parallel of sub-groups constitute different texts in different channels, for example, $a^1_1$, $b^2_1$, $c^1_1$, $D^2_2$, etc., for channel 1. Thus the duration for the transmission of each signal or block of the parallel or sub-groups is equal to twice the propagation time, and the total duration of a rotation is equal to $6p$ ($p$=propagation time, see FIG. 1).

In the figures of the drawings the stations are in a master-slave relation, one station being correction-giving and the other correction-receiving. As will appear, the present system boils down to having a synchronizing character or element for each separate signal or group of signals, for which reason it is sometimes referred to as a "signal master" system.

The division in groups is illustrated in FIG. 1 relative to two equivalent stations M and S. The groups are indicated in a counter having two states, which thus locally marks the transmitted and received signals successively 1–2–1–2–1 etc., as long as the circuit works undisturbedly. The local mark will only affect or control the transmission path after the reception of a disturbed signal.

(2) The circuit (FIG. 4)

According to the invention two counters are used in each of two communicating stations, namely distributor V or V′ and counter T or T′, respectively, see also FIG. 3. The local binary counter or distributor V or V′ normally passes to the next state after every desired signal is correctly received. However, when an error is detected a warning signal S is transmitted, after the transmission of which warning signal S, the receiving counter T or T′ at that station must remain in the same state until a correct signal is received.

Referring now also to the block diagram shown in FIG. 4, the identical master and slave stations M and S are each shown to have a tape transmitter TR and TR′ for the message multi-element 5 code signals which may feed constant radio multi-element 7 code signal transmitter code converter 5/7 and 5/7′, and thence be transmitted to the transmission line toward the other station. In this transmission line, there are shown switches *st*1 and *ss* or *st*1′ and *ss′*, which may be operated when the special service signal S is to be transmitted to request a repetition, in case an error has been detected at that station. The tape transmitter TR or TR′ is controlled by the binary counter distributor V or V′ which in turn is controlled by the signal frequency generator G or G′ which generator may be switched by switch *st*4 or *st*4′ to a binary divider DIV. or DIV.′ for halving the counting of the distributor V or V′ in the event one error occurs or a special service signal S is received.

The receiving part of these stations M and S may comprise a code converter 7/5 or 7/5′ for the message and special signals S, where each signal is tested by the error detector ST or ST′. If the signal is correct, that is, if it is not mutilated and it is in the expected numbered group, it passes directly through switch *st*2 or *st*2′ to the tape printer PR or PR′ at which time the signal also operates the binary counter T or T′, which counts alternate signals, similarly to the distributor counter V or V′.

If a mutilated signal is received or an error is detected in the error detector ST or ST′, this circuit is operated to operate all of its switches *st*1, *st*2, *st*3 and *st*4 or *st*1′, *st*2′, *st*3′ and *st*4′. The switch *st*1 or *st*1′ connects the special service signal S generator GEN. or GEN.′ for transmitting the special service signal S to the opposite station. The switch *st*2 or *st*2′ operates to prevent the mutilated signal which was received from being passed on to the printer PR or PR′ and also from being counted in the counter T or T′, respectively. The switch *st*3 or *st*3′ operates to prevent the tape transmitter TR or TR′ from transmitting the next traffic signal. And lastly, the switch *st*4 or *st*4′ connects the signal frequency generator G or G′ to the binary divider DIV. or DIV.′ to halve the number of counts to the distributor counter V or V′, respectively.

If a correct character or signal, however, is received and tested to be correct in the error detector circuit ST or ST′, but it does not belong to the correct numbered group which is determined by the comparator E or E′ via the conductors 10 or 10′, the repetition determining circuit SS or SS′ is also energized, which repetition determining circuit SS or SS′ is further energized via the conductor 11 or 11′ from the error detector circuit ST or ST′, and also is energized via conductor 12 or 12′ from the code converter 7/5 or 7/5′. This energization of the repetition determining circuit SS or SS′ also controls the error detector circuit ST or ST′, respectively, via conductor 13 or 13′ to operate all of the above mentioned switches of the error detector, that is, *st*1, *st*2, *st*3, and *st*4 and their respective primes thereof. Furthermore under these conditions, the error detector circuit ST or ST′ also controls the repetition determining circuit to operate its switch *ss* or *ss′* in the transmission line to bypass the open switch *st*1 or *st*1′ from the special service signal S generator GEN. or GEN.′, so that a special service signal S will not be transmitted and the last traffic signal will be transmitted or repeated. This repetition occurs because the tape has been prevented from being stepped by the opening of the switch *st*3 or *st*3′. Now this repeated traffic signal will occur in the proper numbered group if it is properly received.

Also connected to the code converters 7/5 or 7/5′ is the special service signal S detector DET. or DET.′ via conductors 12 and 14 or 12′ and 14′, which detector DET. or DET.′ when energized controls via conductor 15 or 15′ the repetition determining circuit SS or SS′. This repetition determining circuit SS or SS′ is energized, however, only when the counters V and T or V′ and T′ are in the same numbering or counting positions, which is indicated via the conductor 20 or 20′ from the comparator circuit E or E′. Then this means that the last traffic signal was mutilated and it is to be repeated as described above, because the open switch *st*3 or *st*3′, which has been opened by the operation of the error detector ST or ST′ which is also energized by the operation of the repetition determining circuit SS or SS′, prevents the stepping of the tape in the tape transmitter TR or TR′, and the operation of the switch *ss* or *ss′* bypasses the open switch *st*1 or *st*1′ as stated before.

However, when the received special service signal S is detected in its signal S detector DET. or DET.′ and the counters V and T or V′ and T′ in that station are different and not in the positions of the same numbered group, then just the error detector circuit ST or ST′ is operated via conductor 10 or 10′ as mentioned before. Then the repetition determining circuit SS or SS′ is not operated, and the special signal S is repeated again so it will come in the proper numbered group.

(3) The operation (FIG. 3)

In FIG. 3 an alphabet of small letters ("a," "b") is transmitted from the master station M, which is the one starting the communication on the left to the right, and an alphabet of capital letters ("A," "B") from the slave station S on the right to left. Successive associated groups for the letters are indicated by numbers in parentheses after each letter. After the correct reception of every desired letter or signal, the counters T or T′ and V or V′ pass to the next state. It can be derived from a comparison of the states in the comparators E and E′ in FIG. 4 of the counters V and T or V′ and T′, whether a letter correctly received is desired or not. Thus, when the letter is placed in a rectangle (see D near lower part of FIG. 3), it is not desired because it has been already correctly received.

In FIG. 3, during the transmission of the letter "a" by the master station M, its local counter T is in the state 1. This means that the letter "a" transmitted belongs to the path 1 and that the slave station S receiver expects the return of a letter belonging to the path 1. The distributor counter V is also in state 1, thus indicating that path 1 is in use. Slave station S receives the letter "a" in state 1 of its distributor counter V′, corresponding to the path desired by its counter T′ output *o′*, and the letter "a" is printed. Then distributor counter V′ passes to the next state.

Now the slave station S can answer to the correctly received letter "a" by a letter belonging to the path 1, the turn of which it is, so that capital letter "A" belonging to the path 1 is transmitted back from the slave station S. The receiving end of slave station S, now indicates via its output *o′* of its counter T′ that it will only accept a letter belonging to the path 2, as the next letter to be received. This letter "A" is supposed to be received correctly at the master station M. The counter T output *o* at station M announces it will accept a letter from path 1 and as its distributor counter V indicates that the received letter belongs to the path 1, the letter "A" is printed at the master station M, after which both of its counters V and T pass to the next state 2.

Next it is supposed that the letter "b" belonging to the path 2 (of which turn it is and indicated by the counter T) is transmitted by the master station M, but it is received mutilated by the slave station S (see X on vertical time line of receiver S). This causes the error detector ST′ at station S to operate, which in turn controls the switch *st*1′ to transmit the special service signal S to request a repetition. The operation of the error detector ST′ by the mutilated signal also opens switches *st*3′ and *st*2′ to prevent the tape transmitter TR′ from transmitting another signal and to prevent the tape printer PR′ from printing the erroneously received signal, respectively. Furthermore, the switch *st*4′ prevents the distributor counter V′ from passing at this count to the next state 1 and the station S answers the mutilated signal by a warning signal S.

This special signal S is supposed to be correctly received by the station M, but it is not a desired letter, since it is detected in the special signal S detector DET. which controls the error detector ST to operate its contacts *st*2 and *st*3 to prevent it from being printed in the tape printer PR and to prevent the tape transmitter TR from stepping to the next signal, so that the previously transmitted traffic signal will be repeated. Thus the opening of the switches *st*2 and *st*3 also causes the counters T and V to remain in their same states (see also FIG. 3). Now the station M transmits the letter corresponding to the state of the counter T, so it repeats the last letter, the "b." This letter "b" is supposed to be correctly received at station S, and the comparison between the counters V′ and T′ output *o* indicates that this "b" does not belong to the desired path; therefore it is printed by the station S and the counters T′ and V′ pass to their next states.

This means that now the station S can proceed with the transmission of the next letter "B" belonging to the path 2, of which it is the turn. In the case of the supposed correct reception at station M, this letter "B" is accepted, because the counters V and T at master station M now agree there also.

To avoid the delay by repetition of a repeated traffic signal, the counter V or V′, after the reception of an error or of a warning signal S, remains once in the same state. This is effected by the operation of the switch *st*4 or *st*4′ by the error detector circuit ST or ST′ which prevents the signal generator G or G′ from operating the distributor counter V or V′ for the particular letter signal, but instead operates the binary divider DIV. or DIV.′ which causes the counter V or V′ to skip a count. In other words, upon a repeated successive reception of mutilated and/or service signals, the distributor V or V′ steps only every two revolutions until a correct signal is received. Thus the numbering is started after each first reception of a mutilated or a special service signal. Thus a certain numbered path can immediately be disposed of after the detection of an error in this path and the error can be corrected at once. As a mutilation is detected at both ends of the circuit, and as, consequently at both ends the counters remain in the same state, the counters V or T and V′ or T′ will count together synchronously, when only a single error is to be corrected.

If, however, a double error occurs, as is indicated in the lower half of the time diagram of FIG. 3, an unnecessary repetition may have to be made in order for the signals to be detected in the proper numbered groups, because of the halving of the counts of the counter V or V'. In this case a repeated traffic signal may be correctly received but then will not be in the proper expected numbered group as shown in the diagram by a rectangle around the letter "D" 2 in FIG. 3. Such only occurs when two successive errors or an error and a special service signal occur successively, and since this possibility is rarer than the occurrence of a single error or a single special service signal, the overall speed of the communications is materially increased. This increase is due to the greater number of delays which occur in the prior art system employing repetition cycles where one or more traffic signals must be repeated for each error correction.

What is claimed is:

1. An automatic error correction device for a rhythmic telecommunication system for multi-element code signals between two stations, each station comprising:

(I) a transmitter having:
- (A) a tape transmitter means (TR or TR'),
- (B) a single special signal generator means (GEN. or GEN.') for transmitting a special service signal (S), and
- (C) a distributor binary counter (V or V') connected to and controlling said tape transmitter to associate alternately transmitted traffic signals with different groups; and (II) a receiver having:
- (A) an error detector (ST or ST') for detecting errors in each multi-element code signal received,
- (B) a special signal detector (DET. or DET.') for detecting said special service signals (S),
- (C) a receiver binary counter (T or T') to count each correctly received signal and associate them with different numbered groups,
- (D) a printer (PR or PR') for the correct and desired received signals,
- (E) a comparator (E or E') for comparing the states of said distributor counter and said receiver counter for each received signal,
- (F) means (SS or SS') controlled by each received signal, said error detector, said comparator, and said special signal detector to determine when a signal is to be repeated,
- (G) means (*st*1, *st*2, *st*3 or *st*1', *st*2', *st*3') controlled by said error detector to control said tape printer, said receiving counter, and said tape transmitter to prevent printing, counting and transmission, respectively, of the next message signal when any one of the following signals is received; an erroneous signal, a special service signal (S), and a signal of an unexpected group, and
- (H) means (DIV. or DIV.') controlled (*st*4 or *st*4') by said error detector to halve the counting of said distributor counter when the first one of the following signals is received after a traffic signal: an erroneous signal, and a special service signal (S).

2. A system according to claim 1 wherein said transmitter and said receiver include code converters (5/7 and 7/5 or 5/7' and 7/5') for the multi-element code signals.

3. A system according to claim 1 wherein one station re-transmits (*ss* or *ss'*) its last transmitted traffic signal during the next rotation when its associated receiver correctly receives the first special service signal (S) after reception of a traffic signal, only if the position of the two counters of a pair correspond whereas in the case of different positions a service signal is transmitted.

4. A system according to claim 1 wherein said receiver after correct reception of a traffic signal, prints (*st*2 or *st*2') said traffic signal if and only if the receiver counter and the distributor counter positions correspond.

5. A system according to claim 1 wherein said receiver after receiving a signal detected to be erroneous in said error detector circuit includes means (*st*1 or *st*1') in its associated station to transmit said special service signal (S) by operation of said special signal generating means in said associated station.

6. A system according to claim 1 wherein said distributor counter takes one step for each distributor rotation at the relevant end of the system during normal working, but after the first reception and odd-numbered receptions of a mutilated signal and/or of a service signal, the distributor rotation counter remains in the same position for the next distributor rotation.

7. A system according to claim 1 wherein said receiver counter takes one step after the correct reception of each traffic signal at such end of the system if the positions of the two counters of a pair correspond but the receiver counter remains in the same position on reception of a mutilated signal or of a service signal.

8. A system according to claim 1 wherein said distributor counter and said receiver counter are in the same counting state after the initial synchronism.

References Cited

UNITED STATES PATENTS

| | | |
|---|---|---|
| 2,970,189 | 1/1961 | Van Dalen et al. |
| 2,988,596 | 6/1961 | Van Dalen. |
| 3,001,018 | 9/1961 | Van Dalen. |
| 3,005,871 | 10/1961 | Rudolph. |
| 3,154,638 | 10/1964 | Van Dalen. |
| 3,156,767 | 11/1964 | Van Duuren, et al. |

THOMAS A. ROBINSON, Primary Examiner

U.S. Cl. X.R.

178—3: 340—146.1

PO-1050
(5/69)

UNITED STATES PATENT OFFICE
CERTIFICATE OF CORRECTION

Patent No. 3,462,550 Dated Aug. 19, 1969

Inventor(s) C. J. Van DALEN

It is certified that error appears in the above-identified patent and that said Letters Patent are hereby corrected as shown below:

Column 1, line 70, "a" should read -- as --. Column 2, line 48, after "service" insert -- signal -- ; line 57, "In" should read -- On --. Column 3, line 10, "prepared" should read -- repeated -- ; line 33, after "time" insert -- diagram --. Column 4, line 26, "radio" should read -- ratio -- . Column 6, line 42, "not" should be deleted.

SIGNED AND
SEALED
DEC 23 1969

(SEAL)
Attest:

Edward M. Fletcher, Jr.
Attesting Officer

WILLIAM E. SCHUYLER, JR.
Commissioner of Patents